United States Patent
Izumi et al.

(10) Patent No.: US 6,806,714 B2
(45) Date of Patent: Oct. 19, 2004

(54) DETECTOR OF NEAR-INFRARED LIGHT

(75) Inventors: Mitsuru Izumi, Tokyo (JP); Osami Yanagisawa, Onomichi (JP); Takahiro Nakayama, Utsunomiya (JP); Masato Arai, Yokohama (JP)

(73) Assignee: President of Tokyo University of Mercantile Marine, Tokyo (JP)

( * ) Notice: Subject to any disclaimer, the term of this patent is extended or adjusted under 35 U.S.C. 154(b) by 0 days.

(21) Appl. No.: 10/394,164

(22) Filed: Mar. 24, 2003

(65) Prior Publication Data

US 2004/0140805 A1 Jul. 22, 2004

(30) Foreign Application Priority Data

Jan. 20, 2003 (JP) .................................... 2003-010735

(51) Int. Cl.[7] ................................................ G01V 3/00
(52) U.S. Cl. ...................................... 324/318; 324/309
(58) Field of Search ................................. 324/318, 309, 324/307, 319, 316, 315, 314, 322; 600/412; 558/274; 430/503; 252/62; 429/44; 250/332

(56) References Cited

U.S. PATENT DOCUMENTS

| 3,636,354 | A | * | 1/1972 | Leheny et al. ............... 250/352 |
| 4,500,784 | A | * | 2/1985 | Hacskaylo ............... 250/339.11 |
| 5,263,482 | A | * | 11/1993 | Leunbach .................... 600/412 |
| 5,604,048 | A | * | 2/1997 | Nishihara et al. ............. 429/44 |
| 5,962,205 | A | * | 10/1999 | Arakawa et al. ............ 430/503 |
| 6,093,338 | A | * | 7/2000 | Tani et al. ............. 252/62.9 R |
| 6,534,670 | B2 | * | 3/2003 | Yoshisato ................... 558/274 |
| 6,570,158 | B2 | * | 5/2003 | Feygin ....................... 250/332 |

FOREIGN PATENT DOCUMENTS

JP  2000-74737  3/2000

OTHER PUBLICATIONS

23rd International Conference on Low Temperature Aug. 20–27, 2002. Hiroshima Japan—Takahiro et al.*

* cited by examiner

Primary Examiner—Brij B. Shrivastav
(74) Attorney, Agent, or Firm—Oblon, Spivak, McClelland, Maier & Neustadt, P.C.

(57) ABSTRACT

A detector of near-infrared light includes a light receiving device having a perovskite-type composite oxide expressed by a general formula of $La_{1-x}Pr_xCrO_3$ (where $0<x<1$) and magnetization measuring means for measuring an increase in magnetization in the composite oxide of the light receiving device when the light receiving device is irradiated with near-infrared light at room temperature.

7 Claims, 4 Drawing Sheets

DETECTOR OF NEAR-INFRARED LIGHT

CROSS-REFERENCE TO RELATED APPLICATIONS

This application is based upon and claims the benefit of priority from the prior Japanese Patent Application No. 2003-10735, filed Jan. 20, 2003, the entire contents of which are incorporated herein by reference.

BACKGROUND OF THE INVENTION

1. Field of the Invention

The invention relates to a detector of near-infrared light.

2. Description of the Related Art

The detection of near-infrared light is applied to, for example, environmental measurement, such as the measurement of water droplets, dust in the atmosphere and the like, the detection of gas and the analysis of trace materials in various industrial fields. It is thought that the detection of near-infrared light will be applied further to medical diagnosis and the like in the future.

To be specific, there has been carried out measurement of fine particles by scattering in the atmosphere by the use of an infrared laser (observations of weather and the observations of air pollution by the distribution of cloud, fog, and the like). The size of the particles observed in this measurement depend on the wavelength of the infrared laser. For this reason, a high sensitivity device capable of detecting near-infrared light after passing through the atmosphere is needed in order to broaden the scope of measurable objects and to enable more detailed observation.

Further, trace materials can be analyzed by utilizing the fact that near-infrared light easily passes through animals and plants and that bodies absorbing molecules having functional groups including hydrogen (OH, NH, CH, and the like) exist in a near-infrared region. For this reason, similarly, it is desired to develop a detector of near-infrared light having high sensitivity.

Incidentally, feeble light is generally detectable by the use of a photodetector, such as photomultiplier tube or the like. However, a detector having high sensitivity for light in the near-infrared region does not exist, therefore it is desired to be developed.

As a detector of near-infrared light, one has been known that uses a light-emitting diode (avalanche photo diode) as a light receiving device and applies an electron multiplication action in the diode to the measurement of the number of photons of near-infrared light. However, in this detector, the light receiving device needs to be cooled in order to reduce noise and to amplify an S/N ratio and hence presents a problem that it has a complex structure.

On the other hand, in Jpn. Pat. Appln. KOKAI Publication No. 2000-74737 is disclosed a photodetector that has a high-frequency oscillator, a cavity resonator, a magnet for modulating a magnetic field, and a light-detecting part made of (Pr, Ca) $MnO_3$ and sweeps the magnetic field while applying a constant frequency thereby to detect a change in electron spin in the (Pr, Ca) $MnO_3$ as feeble light (for example, near-infrared light) with an ESR (electron spin resonance) measurement instrument.

However, the photodetector disclosed in the above-mentioned patent gazette has an operating temperature of a liquid nitrogen temperature or lower of from 50 K to 80 K and thus needs to be provided with a cryo-cooler. As a result, the photodetector is problematic, in terms of having a complex structure and being increased in size, which not only increases cost but also limits the usability.

BRIEF SUMMARY OF THE INVENTION

The object of the invention is to provide a photodetector of near-infrared light that can detect near-infrared light at room temperature, with high sensitivity.

According to the invention, there is provided a detector of near-infrared light comprising:

a light receiving device having a perovskite-type composite oxide expressed by a general formula of $La_{1-x}Pr_xCrO_3$ (where 0<x<1); and magnetization measuring means for measuring an increase in magnetization in the composite oxide of the light receiving device when the light receiving device is irradiated with near-infrared light at room temperature.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

Figure 1:
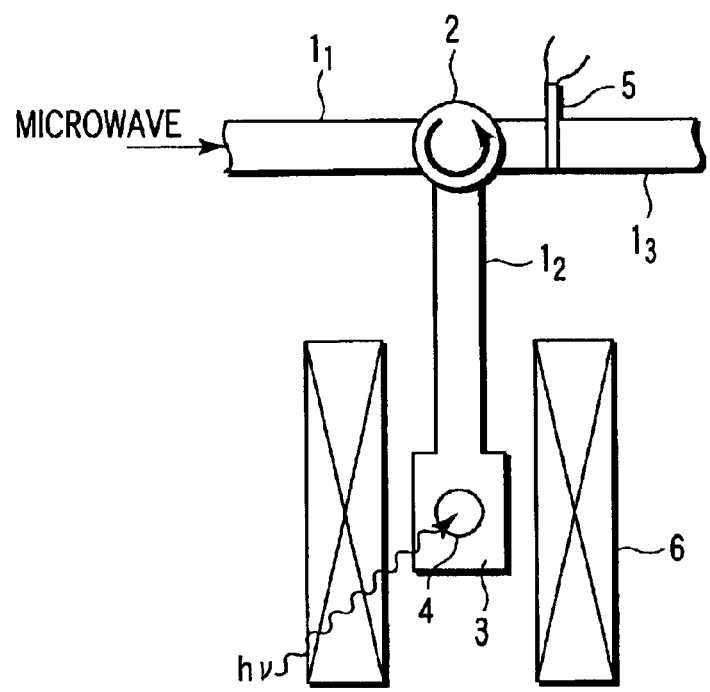
FIG. 1 is a schematic view showing a detector of near-infrared light in accordance with the invention.

Hereafter, a detector of near-infrared light in accordance with the invention will be described.

A light receiving device has a perovskite-type composite oxide expressed by a general formula of $La_{1-x}Pr_xCrO_3$ (where $0<x<1$). Magnetization measuring means measures an increase in magnetization in the composite oxide of the light receiving device when the light receiving device is irradiated with near-infrared light at room temperature.

Of the above-mentioned perovskite-type composite oxides, an oxide in which x is 0.5 or smaller (particularly, from 0.05 to 0.3) in the general formula has higher sensitivity to the near-infrared light.

The perovskite-type composite oxide is manufactured, for example, by the following method.

First, powders of $La_2O_3$, $Pr_6O_{11}$, and $Cr_2O_3$ are weighed and mixed with each other to make a composition expressed by a general formula $La_{1-x}Pr_xCrO_3$ (where $0<x<1$) to thereby prepare a mixed oxide powder. Then, this mixed oxide powder is formed into a tablet under a pressure of from 400 $kg/cm^2$ to 600 $kg/cm^2$ and then the tablet is preliminarily sintered in an atmosphere at a temperature of 1100° C. Next, this preliminarily sintered body is ground and again formed into a tablet and then the tablet is finally sintered in an atmosphere at a temperature of from 1350° C. to 1500° C., i.e., higher than the sintering temperature of the preliminarily sintered tablet, to thereby manufacture a perovskite-type composite oxide having the general formula.

The foregoing light receiving device has, for example, three forms, described below.

(1) Perovskite-type composite oxide powder enclosed in a capsule transparent for near-infrared light.

This transparent capsule is made of quartz, for example.

The foregoing powder is made by grinding the above-mentioned sintered body.

Preferably, the powder has an average particle size of from 3 µm to 5 µm.

(2) Thin film of the perovskite-type composite oxide formed on a substrate

Preferably, this substrate is made of a non-magnetic material, for example, MgO or $SrTiO_3$ having little effect on the measurement of magnetization of the thin film of the above-mentioned perovskite-type composite oxide.

The thin film is formed on the substrate by a sputtering method using the sintered body as a target.

Preferably, the thin film has a thickness of from 0.1 µm to 0.5 µm. A thin film having a thickness less than 0.1 µm makes it difficult to detect the near-infrared light with high sensitivity. On the other hand, a thin film having a thickness more than 0.5 µm is too thick as compared with the penetration depth of the near-infrared light, which raises the possibility that the thin film will not function as a light receiving device.

(3) Pellet including the perovskite-type composite oxide and diluted

This pellet is manufactured by mixing powder made by grinding the above-mentioned sintered body with a non-magnetic transparent material, which is a diluting material, for example, $SiO_2$, and then by forming the mixed powder into a pellet, and then by sintering the pellet.

Preferably, the pellet has a thickness of from 100 µm to 500 µm.

The above-mentioned magnetization measuring means includes, for example, an electron spin resonance measurement instrument that has magnetic-field applying means for applying a magnetic field to the above-mentioned light receiving device and sweeping the magnetic field, an AC inductance coil for measuring an increase in magnetization in the light receiving device, a static magnetization measurement instrument, and the like.

Next, a detector of near-infrared light in accordance with the invention will be described with reference to the drawings.

FIG. 1 is a schematic view of a detector of near-infrared light provided with a light receiving device and an electron spin resonance measurement instrument having magnetic-field applying means for applying a magnetic field to the light receiving device and sweeping the magnetic field.

Three waveguides $1_1$ to $1_3$ are joined to each other around a circulator 2. A microwave is introduced into a first waveguide $1_1$ extending to the left from the circulator 2. A transparent cavity resonator 3 is mounted to the bottom end of a second waveguide $1_2$ extending downward from the above-mentioned circulator 2. A transparent capsule (light receiving device) 4 in which the above-mentioned perovskite-type composite oxide expressed by the formula is enclosed is placed in the cavity resonator 3. In a third waveguide $1_3$ extending to the right from the circulator 2 is arranged a detector, for example, a PIN diode 5, for detecting a microwave power that is absorbed and attenuated by the powder of the perovskite-type composite oxide. An electromagnet 6 is arranged in such a way as to surround the cavity resonator 3.

Here, in place of the transparent capsule in which the powder of the perovskite-type composite oxide is enclosed, the substrate that is described in the foregoing (2) and has the perovskite-type composite oxide formed thereon, or the pellet that is described in the foregoing (3) and has the perovskite-type composite oxide included therein and diluted can be used in the above-mentioned cavity resonator 3.

Next, operation of the detector shown in FIG. 1 will be described.

A microwave is introduced through the first waveguide $1_1$, the circulator 2, and the second waveguide $1_2$ into the cavity resonator 3. The powder of the perovskite-type composite oxide enclosed in the capsule 4, which is the light receiving device in the cavity resonator 3, is irradiated with near-infrared light at room temperature. The magnetization of the powder is substantially increased in response to the intensity of the near-infrared light. Next, by generating a magnetic field by the electromagnet 6 and sweeping the magnetic field to set a suitable magnetic field, resonance is generated thereby to increase the magnetization of the powder of the perovskite-type composite oxide, whereby the microwave is absorbed and hence the power of the microwave is attenuated. This attenuated microwave is introduced from the cavity resonator 3 through the second waveguide $1_2$ and the circulator 2 into the third waveguide $1_3$, and a current value (the amount of attenuation of the microwave, a reduced current value), that is, the intensity of electron spin resonance (ESR) is measured by the PIN diode 5 arranged in the third waveguide $1_3$.

The current value (the intensity of ESR) measured by the PIN diode 5 in this manner correlates to an increase in magnetization caused by applying the near-infrared light to the powder of the perovskite-type composite oxide and the increase in magnetization correlates to the intensity of the near-infrared light. For this reason, the intensity of the near-infrared light applied to the powder (the intensity of the near-infrared light at room temperature) can be detected by measuring the current value.

Figure 2:
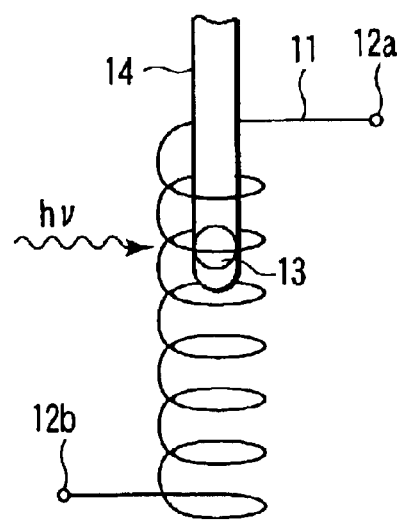
FIG. 2 is a schematic view showing another detector of near-infrared light in accordance with the invention.

FIG. 2 is a schematic view showing a detector of near-infrared light provided with a light receiving device and an AC inductance coil.

A reference numeral 11 in the drawing denotes an AC inductance coil (Helmholtz-type coil) having terminals 12a, 12b on both ends. The transparent capsule 13 in which the powder of the perovskite-type composite oxide expressed by the foregoing general formula is enclosed is received in a quartz tube shield 14 to construct a light receiving device. This shield 14 is inserted into the AC inductance coil 11.

In this respect, in place of the capsule receiving shield inserted into the AC inductance coil 11 as the light receiving device, the substrate that is described in the foregoing (2) and has a thin film of the perovskite-type composite oxide formed thereon, or a pellet that is described in the foregoing (3) and has the perovskite-type composite oxide included therein and diluted can be used.

Next, the operation of the foregoing detector shown in FIG. 2 will be described.

The shield (light receiving device) 14 in which the capsule 13 is received is inserted into the center of the upper half of the AC inductance coil 11 and is adjusted such that the inductance between the terminals 12a and 12b of the inductance coil 11 becomes zero in a dark state. Thereafter, near-infrared light is applied at room temperature to the powder of the perovskite-type composite oxide enclosed in the capsule 13 in the shield 14. The magnetization of the powder is therefore substantially increased in response to the intensity of the near-infrared light. For this reason, an inductance responsive to the increase in magnetization is generated between the terminals 12a and 12b of the inductance coil 11.

In this manner, the inductance measured by the AC inductance coil 11 correlates to an increase in the magnetization caused by the application of near-infrared light to the powder of the perovskite-type composite oxide and the increase in the magnetization correlates to the intensity of the near-infrared light. For this reason, by measuring the inductance, the intensity of near-infrared light (the intensity of the near-infrared light at room temperature) applied to the foregoing powder can be measured.

As described above, the detector of near-infrared light in accordance with the present invention has a light receiving device having the perovskite-type composite oxide expressed by the general formula $La_{1-x}Pr_xCrO_3$ (where $0<x<1$) and magnetization measuring means for measuring an increase in magnetization in the composite oxide of the light receiving device when the composite oxide is irradiated with near-infrared light at room temperature.

The detector having this construction has:

(1) operatability at room temperature and selectivity of wavelength of the near-infrared light that the light receiving device increases magnetization selectively to the near-infrared light (photon energy: 1.17 eV, wavelength: 1.06 $\mu$m) at room temperature and that the intensity of near-infrared light can be measured by the magnetization measuring means;

(2) excellent linearity that magnetization is induced by light, that is, the intensity of a light detection signal is increased in response to an increase in the intensity of the near-infrared light; and (3) excellent reversible responsivity that magnetization reversibly responds to repeated applications of near-infrared light.

Thus, according to the invention, it is possible to eliminate the necessity of a cryo-cooler, required by a conventional photodetector having an operating temperature of liquid nitrogen temperature or lower of from 50 K to 80 K, and thus to realize a detector of near-infrared light that has a simple structure, a small size, and an expanded range of use and can be manufactured at low cost.

Further, it is possible to realize a detector of near-infrared light that can detect the intensity of near-infrared light with high sensitivity and high accuracy and has high reliability and durability.

Hereafter, the preferred embodiments of the invention will be described in detail.

[Manufacture of $La_{0.5}Pr_{0.5}CrO_3$]

Firstly, powders of $La_2O_3$, $Pr_6O_{11}$, and $Cr_2O_3$ each having a purity of 99.9% or more were weighed and mixed with each other to make a composition of $La_{0.5}Pr_{0.5}CrO_3$ thereby to prepare a mixed oxide powder. Then, this mixed oxide powder was formed into a tablet having a diameter of 3.3 cm under a pressure of 400 kg/cm$^2$ and then the tablet was preliminarily sintered in an atmosphere at a temperature of 1100° C. for 24 hours. Then, this preliminarily sintered body was ground and again formed into a tablet having a diameter of 3.3 cm and then the tablet was finally sintered in an atmosphere at a temperature of 1350° C. for 24 hours to thereby manufacture a tablet-shaped sintered body.

It confirmed by X-ray diffraction that the obtained sintered body was a composite oxide having a perovskite-type structure expressed by formula $La_{0.5}Pr_{0.5}CrO_3$.

(The First Embodiment: Measurement of the Intensity of ESR)

A device made by JEOL Corp. and having a trade name of JES-RE-1X was used as an X-band spectrometer.

A Nd-YAG laser (hv=1.17 eV, wavelength: 1.06 $\mu$m, power: 130 meV) made by AMCO Corp. and having a trade name of laser model D-500 was used as a near-infrared light source and a Capton filter was arranged in its optical path.

Four mg of powder made by grinding the above-mentioned sintered body and having an average particle size of 50 $\mu$m was put into a cavity resonator through a double quartz tube shield mounted to a He-circulation-type cryostat.

Figure 4:
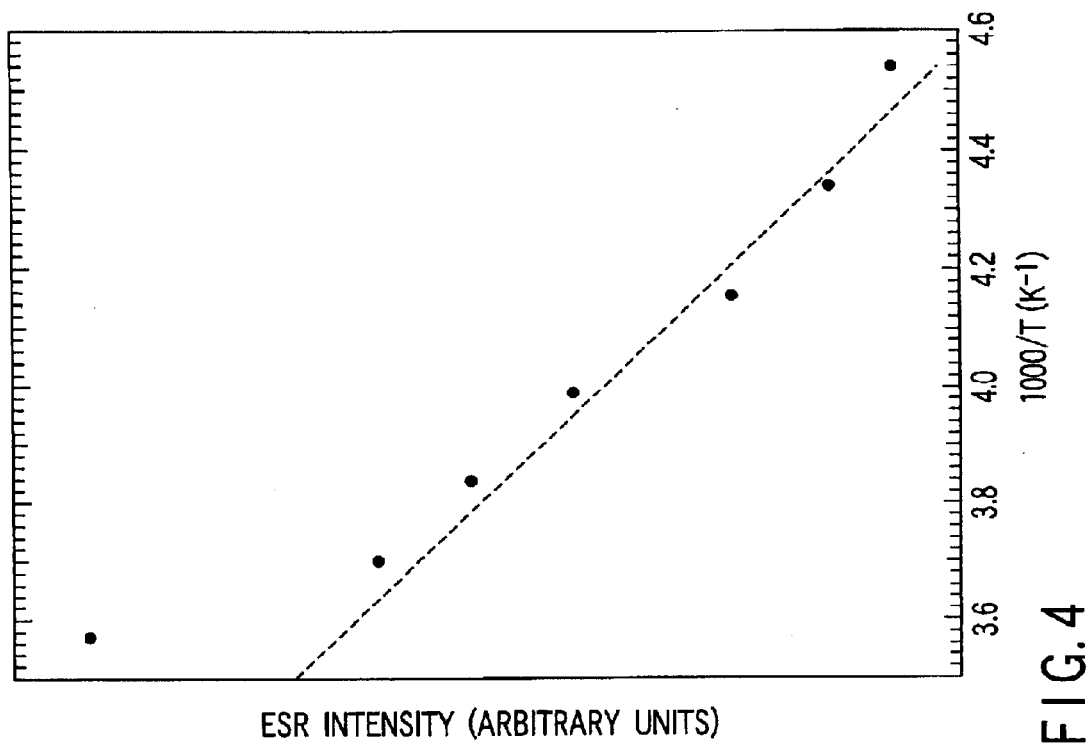
FIG. 4 is a characteristic plot showing the relationship between the temperature of the atmosphere irradiated with laser and the intensity of ESR in the composite oxide that is used for the light receiving device of the first embodiment of the invention and has the perovskite-type structure expressed by the general formula of $La_{0.5}Pr_{0.5}CrO_3$.
Figure 3:
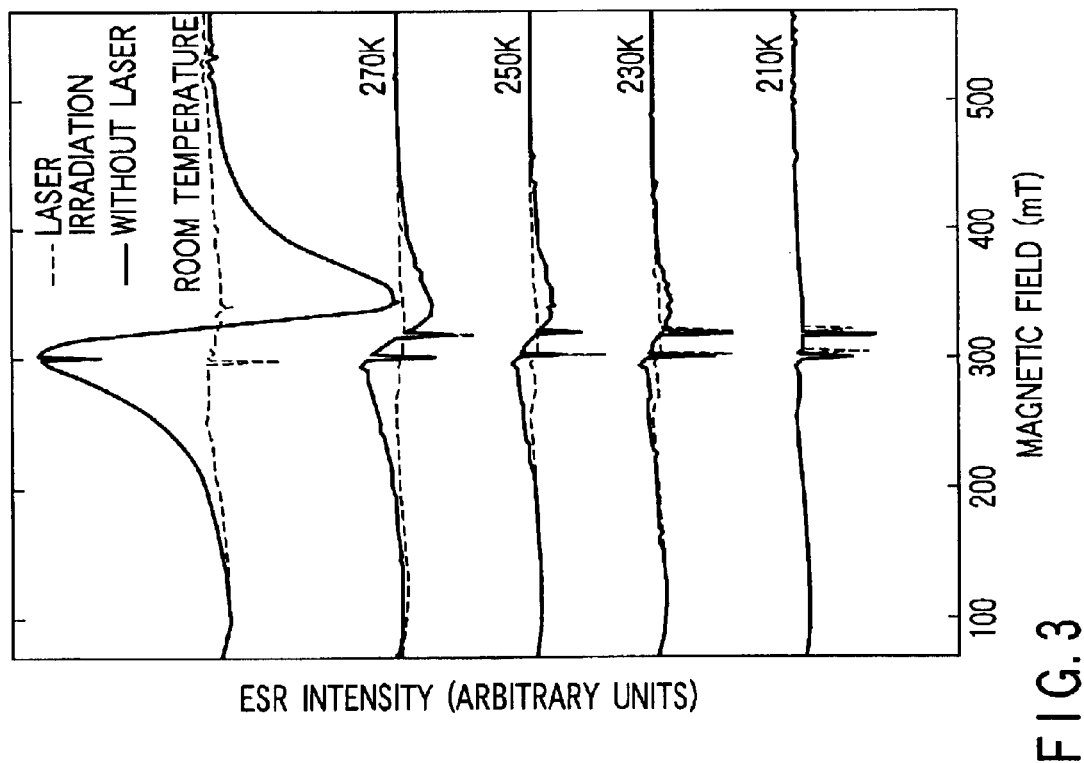
FIG. 3 is a characteristic plot showing the relationship between a magnetic field and the intensity of ESR in a composite oxide that is used for a light receiving device of the first embodiment of the invention and has a perovskite-type structure expressed by a general formula of $La_{0.5}Pr_{0.5}CrO_3$.

Using the above device, the Nd-YAG laser (hv=1.17 eV, wavelength: 1.06 $\mu$m, power: 130 meV) was applied to the powder of the composite oxide, which has the perovskite-type structure expressed by formula $La_{0.5}Pr_{0.5}CrO_3$ and is placed in the cavity resonator, at a focal size of 1 mm$^2$ and at a temperature of from 210 K to room temperature, and at the same time the X-band spectrometer was operated under the conditions of a magnetic field modulation frequency of 100 kHz and a microwave amplitude of 9.0 GHz, to thereby measure the intensity of ESR under a magnetic field from 100 mT to 500 mT. The measurement results are shown in FIG. 3 and FIG. 4. Here, FIG. 3 shows the relationship between the magnetic field and the ESR intensity, broken lines show characteristic lines without laser irradiation, and solid lines show those with laser irradiation. FIG. 4 shows the relationship between the temperature of the atmosphere irradiated with the laser and the intensity of ESR.

It is evident from FIG. 3 and FIG. 4 that when the composite oxide used for the light receiving device of the invention and having the perovskite-type structure expressed by the formula of $La_{0.5}Pr_{0.5}CrO_3$ is irradiated with the near-infrared Nd-YAG laser at room temperature, the composite oxide can produce a large intensity of ESR.

(The Second Embodiment: Change in the Intensity of ESR in Response to a Change in Laser Light Power)

Figure 5:
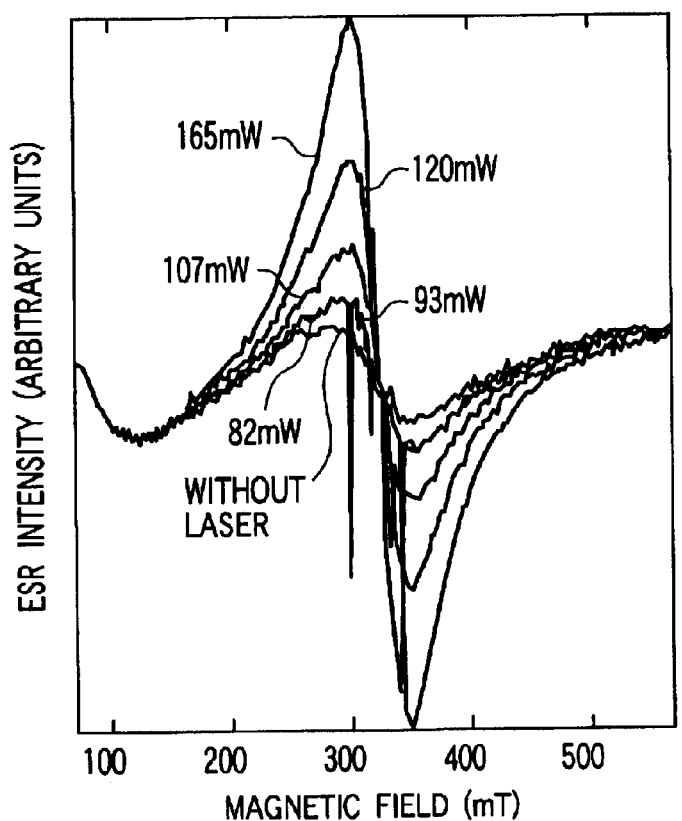
FIG. 5 is a characteristic plot showing the relationship between a magnetic field and the intensity of ESR under different intensity of the light irradiation in a composite oxide that is used for a light receiving device of the second embodiment of the invention and has a perovskite-type structure expressed by a general formula of $La_{0.5}Pr_{0.5}CrO_3$.
Figure 6:
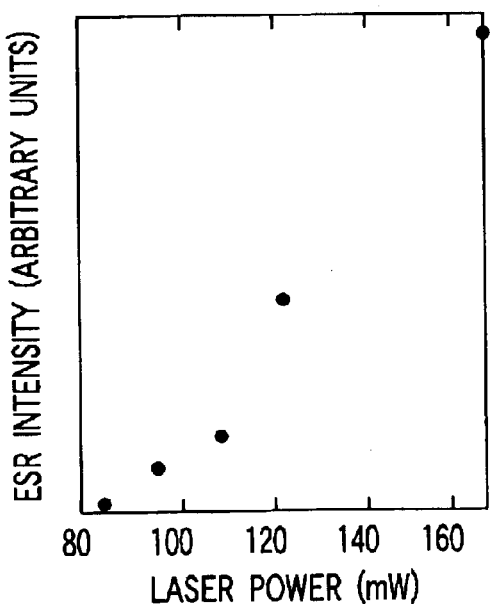
FIG. 6 is a characteristic plot showing the relationship between the incident laser power and the intensity of ESR in the composite oxide that is used for the light receiving device of the second embodiment of the invention and has the perovskite-type structure expressed by the general formula of $La_{0.5}Pr_{0.5}CrO_3$.

The intensity of ESR was measured by the use of the same device and method as in the first embodiment except that the power of the Nd-YAG laser was varied in the atmosphere at room temperature. Measurement results are shown in FIG. 5 and FIG. 6. Here, FIG. 5 shows the relationship between a magnetic field and the intensity of ESR and FIG. 6 shows the relationship between laser power and the ESR intensity.

It is clear from FIG. 5 and FIG. 6 that when the composite oxide used for the light receiving device of the invention and having the perovskite-type structure expressed by the formula of $La_{0.5}Pr_{0.5}CrO_3$ is irradiated with the Nd-YAG laser at room temperature, the composite oxide substantially increases the intensity of ESR in proportion to increase in the power of the laser light, and has high linearity with respect to the laser light (near-infrared light) power.

[Manufacture of $La_{1-x}Pr_xCrO_3$ (where $0.05 \leq x \leq 0.5$)]

Firstly, powders of $La_2O_3$, $Pr_6O_{11}$, and $Cr_2O_3$ each having a purity of 99.9% or more were weighed and mixed with each other to make a composition of $La_{1-x}Pr_xCrO_3$ (where $0.05 \leq x \leq 0.5$) to thereby prepare five mixed oxide powder. Then, each of these mixed oxide powders was formed into a tablet having a diameter of 3.3 cm under a pressure of 400 kg/cm$^2$ and then the tablet was preliminarily sintered in an atmosphere at a temperature of 1100° C. for 24 hours. Then, this preliminarily sintered body was ground and again formed into a tablet having a diameter of 3.3 cm and then the tablet was finally sintered in an atmosphere at a temperature of 1350° C. for 24 hours to thereby manufacture a tablet-shaped sintered body. In this manner, five tablet-shaped sintered bodies were manufactured.

It was confirmed by X-ray diffraction that the five sintered bodies obtained were composite oxides having the perovskite-type structures expressed by the general formula $La_{1-x}Pr_xCrO_3$ (where x=0.05, 0.1, 0.25, 0.3, and 0.5), respectively.

(The Third Embodiment: Reversible Responsivity to Laser Light)

Figure 7:
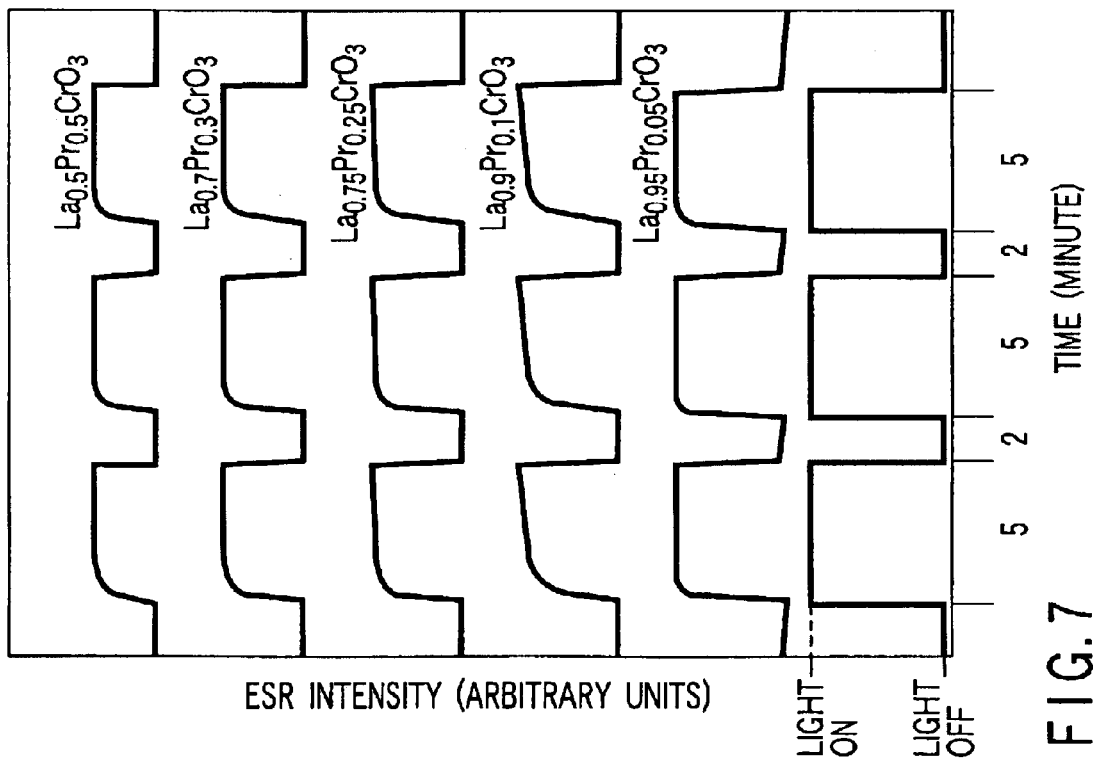
FIG. 7 is a characteristic plot showing a responsivity to Nd-YAG laser light in a composite oxide that is used for a light receiving device of the third embodiment of the invention and has a perovskite-type structure expressed by five variations of general formula $La_{1-x}Pr_xCrO_3$ (where x=0.05, 0.1, 0.25, 0.3, and 0.5).

Four mg of each powder produced by grinding each of the above-mentioned sintered bodies and having an average particle size of 50 μm was placed into the cavity resonator. Then, the intensity of ESR was measured by the use of the same device and method as in the first embodiment except that the Nd-YAG laser light was applied to the powder in an atmosphere at room temperature in such a manner that the laser light was intermittently turned on for 5 minutes and off for 2 minutes. Measurement results are shown in FIG. 7. Here, a waveform at the bottom in FIG. 7 shows the on/off timing of the Nd-YAG laser light.

It is clear from FIG. 7 that when the composite oxide used for the light receiving device of the invention and having the perovskite-type structure expressed by the general formula $La_{1-x}Pr_xCrO_3$ (where x=0.05, 0.1, 0.25, 0.3, and 0.5) is irradiated with the Nd-YAG laser light at room temperature, the composite oxide substantially increases the intensity of ESR, and that when the composite oxide is not irradiated with the Nd-YAG laser light at room temperature, the composite oxide does not produce the intensity of ESR. That is, it is clear that the composite oxide has excellent reversible responsivity with respect to high laser light (near-infrared light). In particular, it is clear that the composite oxide having the perovskite-type structure expressed by formula $La_{0.95}Pr_{0.05}CrO_3$ shows a further excellent reversible responsivity when it is intermittently irradiated with the Nd-YAG laser light at room temperature.

[Manufacture of $La_{1-x}Pr_xCrO_3$ (where $0 \leq x \leq 1$)]

Firstly, powders of $La_2O_3$, $Pr_6O_{11}$, and $Cr_2O_3$ each having a purity of 99.9% or more were weighed and mixed to make a composition of $La_{1-x}Pr_xCrO_3$ (where $0 \leq x \leq 1$) to thereby prepare ten mixed oxide powders. Then, each of these mixed oxide powders was formed into a tablet having a diameter of 3.3 cm under a pressure of 400 kg/cm$^2$ and then the tablet was preliminarily sintered in an atmosphere at a temperature of 1100° C. for 24 hours. Then, this preliminarily sintered body was ground and again formed into a tablet having a diameter of 3.3 cm and then the tablet was finally sintered in an atmosphere at a temperature of 1350° C. for 24 hours to thereby manufacture a tablet-shaped sintered body. In this manner, the mixed oxide powders were manufactured into ten tablet-shaped sintered bodies.

It was confirmed by X-ray diffraction that the ten sintered bodies obtained were composite oxides having perovskite-type structures expressed by the general formula $La_{1-x}Pr_xCrO_3$ (where x=0, 0.05, 0.1, 0.25, 0.3, 0.5, 0.7, 0.75, 0.9, and 1), respectively.

(The Fourth Embodiment: Change in the Intensity of ESR Depending on x in a General Formula)

Four mg of each powder produced by grinding each of the above-mentioned sintered bodies and having an average particle size of 50 μm was placed into the cavity resonator through the double quartz tube shield mounted to the He-circulation-type cryostat. Then, the intensity of ESR was measured by the use of the same device and method as in the first embodiment except that the Nd-YAG laser light was applied to the powder in an atmosphere at room temperature. Measurement results are shown in FIG. 8.

Figure 8:
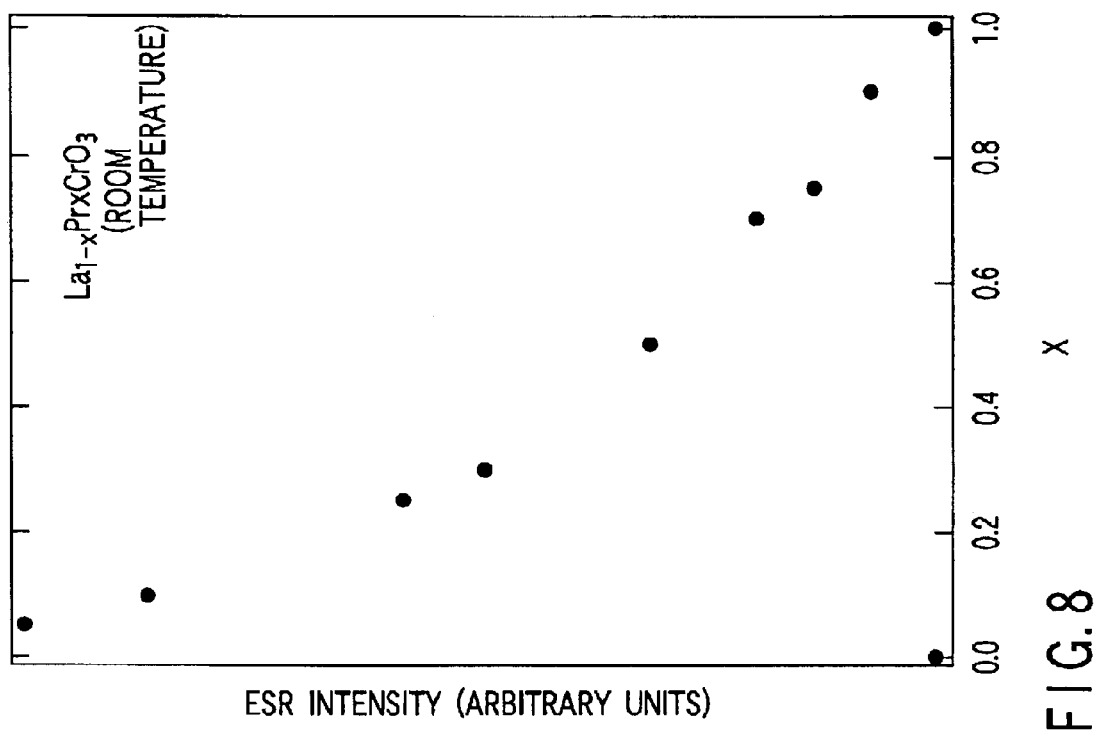
FIG. 8 is a characteristic plot showing the relationship between composition and intensity of ESR in a composite oxide having a perovskite-type structure expressed by the general formula $La_{1-x}Pr_xCrO_3$ (where $0 \leq x \leq 1$) of the fourth embodiment of the invention.

It is clear from FIG. 8 that when the composite oxide used for the light receiving device of the invention and having the perovskite-type structure expressed by the general formula $La_{1-x}Pr_xCrO_3$ (where x is 0.5 or less, x=0.05 to 0.3, in particular) is irradiated with the Nd-YAG laser light at room temperature, the composite oxide can produce a larger ESR intensity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A detector of near-infrared light, the detector comprising;
   a light receiving device having a perovskite-type composite oxide expressed by a general formula $La_{1-x}Pr_xCrO_3$ (where 0<x<1); and
   magnetization measuring means for measuring an increase in magnetization in the composite oxide of the light receiving device when the light receiving device is irradiated with near-infrared light at room temperature.

2. The detector of near-infrared light according to claim 1, wherein x in the general formula is 0.5 or less.

3. The detector of near-infrared light according to claim 1, wherein x in the general formula ranges from 0.05 to 0.3.

4. The detector of near-infrared light according to claim 1, wherein the light receiving device is a transparent capsule in which a powder of the perovskite-type composite oxide expressed by the general formula is enclosed.

5. The detector of near-infrared light according to claim 1, wherein the light receiving device is a thin film made of the perovskite-type composite oxide formed on a substrate.

6. The detector of near-infrared light according to claim 1, wherein the magnetization measuring means is an electron spin resonance measurement instrument having magnetic-field applying means for applying a magnetic field to the light receiving device and sweeping it.

7. The detector of near-infrared light according to claim 1, wherein the magnetization measuring means is an AC inductance coil for measuring an increase in magnetization of the light receiving device.

* * * * *